Sept. 24, 1968 S. KRAUTHAMER ET AL 3,403,318
STATIC INVERTER SYSTEM WITH FREQUENCY REGULATION OF
INVERTER OUTPUT VOLTAGE AS A FUNCTION OF
INVERTER INPUT VOLTAGE AMPLITUDE
Filed Nov. 1, 1965 3 Sheets-Sheet 2
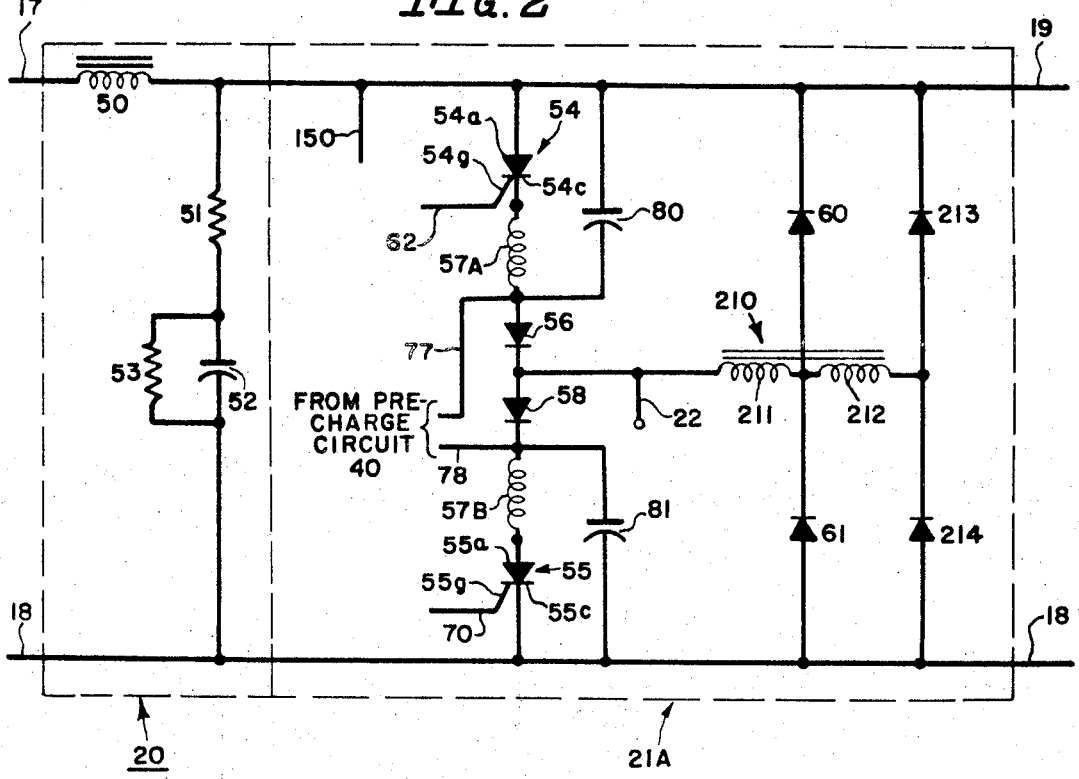
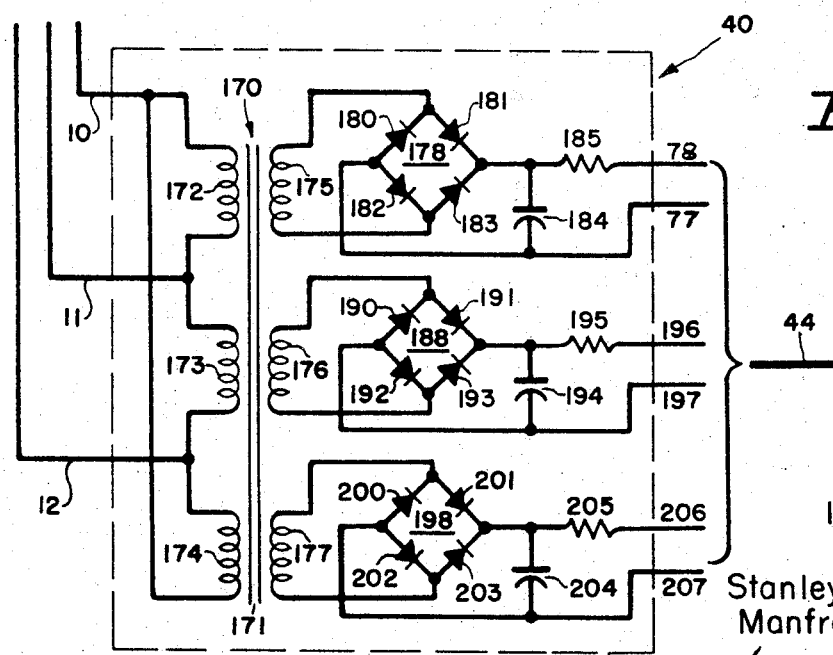
Inventors
Stanley Krauthamer
Manfred Lilienstein
By *James J. Jennings, Jr.*
Attorney

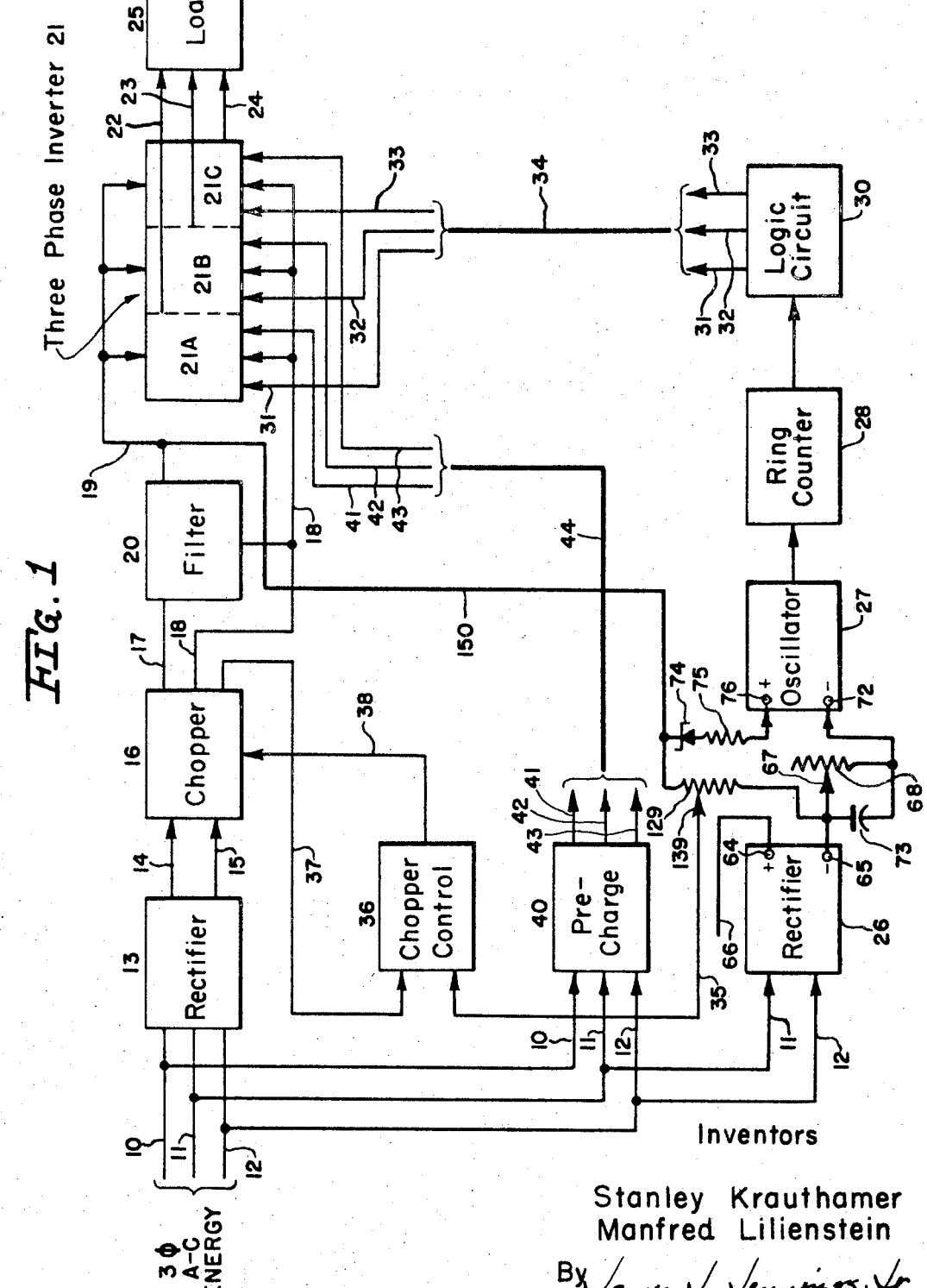

United States Patent Office 3,403,318
Patented Sept. 24, 1968

3,403,318
STATIC INVERTER SYSTEM WITH FREQUENCY REGULATION OF INVERTER OUTPUT VOLTAGE AS A FUNCTION OF INVERTER INPUT VOLTAGE AMPLITUDE
Stanley Krauthamer, Monterey Park, and Manfred Lilienstein, Rolling Hills, Calif., assignors to Borg-Warner Corporation, Chicago, Ill., a corporation of Illinois
Filed Nov. 1, 1965, Ser. No. 505,879
3 Claims. (Cl. 321—5)

ABSTRACT OF THE DISCLOSURE

A rectifier 13 passes a D-C voltage over supply circuit 14, 15 to a chopper circuit 16 which periodically transfers D-C voltage over lines 17, 18 through filter 20 to an inverter 21. A pre-charge circuit 40 provides commutation voltage for the inverter when the inverter energizing voltage is low. Chopper control circuit 36 senses (over 37) the current level pased to the inverter and also senses (over 150, 129, 35) the voltage level passed to the inverter. A voltage-controlled oscillator 27 is also connected to sense the level of the inverter input voltage and to control (through 28, 30) the frequency of the inverter output voltage as a function of the amplitude of the inverter energizing voltage.

---

Figure 3:
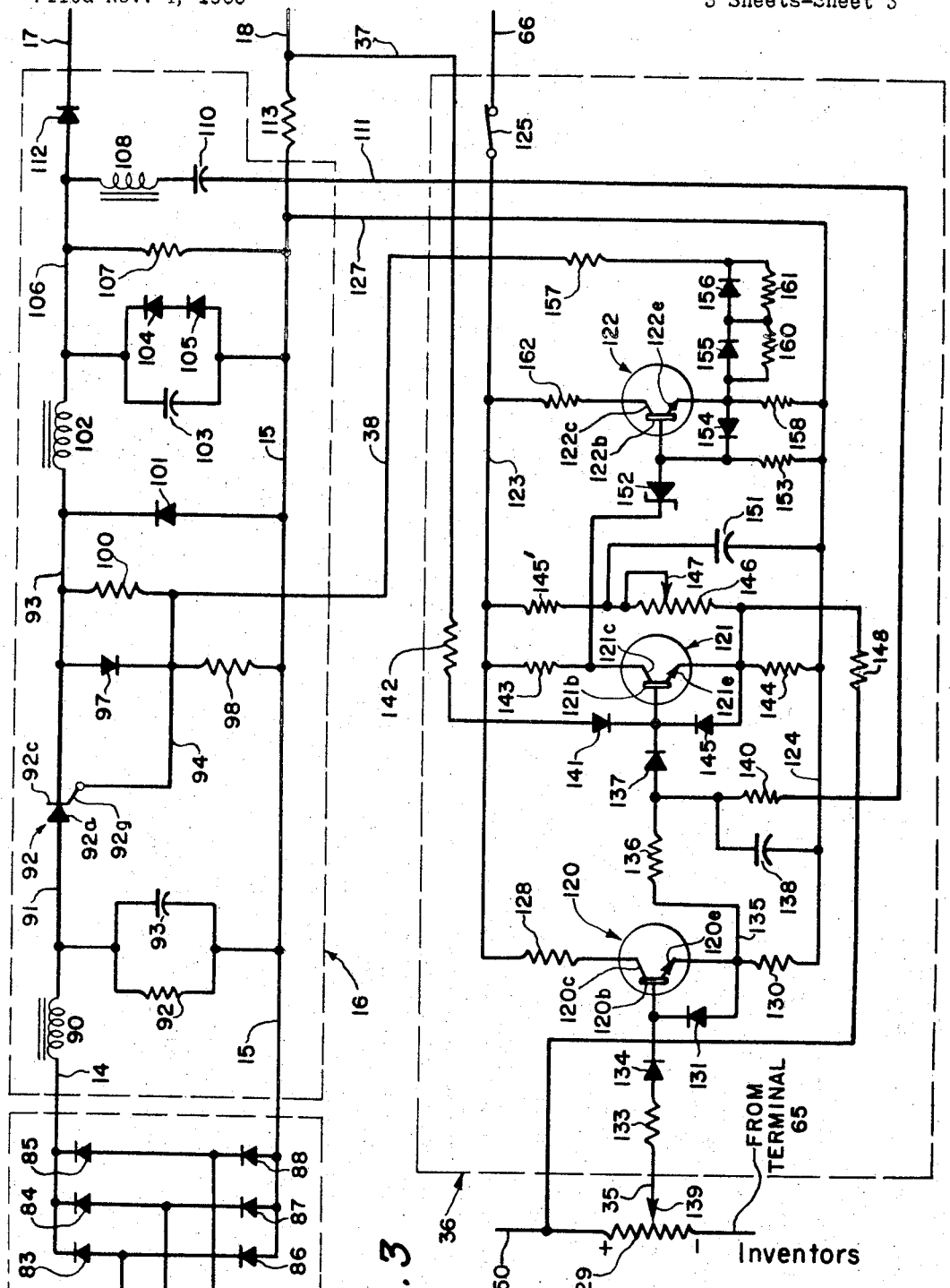

The present invention is directed to an inverter system including a switching arrangement for transferring unidirectional energy to the inverter input circuit, and more particularly to a novel control arrangement for not only regulating operation of the energy transfer circuit in accordance with the level of the D-C voltage and of the D-C current passed to the inverter, but also for adjusting the frequency of the inverter output voltage as a function of the level of the D-C potential applied to the inverter.

As used herein the term "static inverter" refers to an energy inversion system in which there are no rotating parts such as motors and generators to effect the change of energy. Instead semiconductor switches, such as silicon-controlled rectifiers (SCR's), are utilized to translate an input D-C voltage into A-C voltage for passage to a suitable load such as an electrical motor. With the continued improvement of SCR's, particularly the current-handling capability and the ability to withstand appreciable heating, the use of such inverter arrangements has become more and more widespread. It is still mandatory to protect the semiconductor switches in the inverter against over-voltage conditions, and to this end various attempts have been made to provide a regulated energy transfer circuit between the D-C supply circuit and the inverter itself. For convenience such energy transfer circuit will be termed a "chopper" circuit herein and in the appended claims. In addition to protecting against over-voltage conditions, when the motor is initially energized from an inverter and has not yet come up to speed, a considerable starting current is "pulled" by the motor through the inverter. If the inverter circuit can be utilized to limit this initial in-rush of the high starting current, then larger motors can be safely started by the inverter system. The mere provision of a chopper or energy transfer circuit between the D-C supply circuit and the inverter does not serve to completely eliminate this difficulty, largely because of shortcomings in control of such chopper circuit.

It is prime consideration of the present invention to provide an "all-electronic" system for regulating the volts-per cycle ratio of the energy transferred to one or more electrical motors, thus obviating the use of variable transformers in any part of the system, and further to provide a novel and unobvious control circuit for regulating the operation of a chopper circuit coupled between the D-C supply circuit and an inverter, to obviate both over-voltage and excess current conditions which might otherwise damage the inverter components.

As noted above the motor draws a high current when starting, even though only a low-voltage, low frequency energy is supplied to the inverter at this time. In that one widely used system of commutating includes the provision of capacitors in the inverter circuit which are periodically charged by the input D-C energy and thereafter discharged to effect the commutation, the initial low-voltage energization of the inverter may result in failing to charge the commutating capacitors to the level requisite for effective commutation when the associated SCR's are gated on. It is therefore a corollary consideration of the present invention to provide an auxiliary energizing arrangement for insuring the commutating capacitors are always charged to the requisite commutating level, even under starting conditions or when energization of the inverter is interrupted by a chopper or similar energy transfer control arrangement.

In one embodiment, the invention is used with a system for regulating operation of an electrical load coupled to the output connections of an inverter by regulating the amplitude and frequency of the voltage supplied to the load from the inverter. The system also includes a power delivery circuit, having a semiconductor switch, for passing D-C voltage from a supply circuit to the inverter input connections. A control circuit is connected to regulate the operation of the power delivery circuit, and thereby regulate the level of the D-C voltage passed to the inverter. An oscillator circuit is connected to regulate the frequency of the inverter output voltage as a function of the frequency of the oscillator output signal. Particularly in accordance with the present invention, means is provided for sensing the level of the D-C voltage passed to the inverter and for regulating the frequency of the oscillator output signal in relation to such voltage level. Thus, the system maintains a constant volts-per-cycle ratio of the alternating voltage passed to the electrical load. Means is also provided for sensing the level of the D-C current passed to the inverter and when the current level exceeds a safe value, the control circuit operates to interrupt the power delivery circuit and thus prevent delivery of energy at an excessive level to the inverter circuit.

In order to acquaint those skilled in the art with the best mode contemplated for making and using the invention, a preferred embodiment will be described in connection with the accompanying drawings, in the several figures of which like reference numerals identify like elements and in which:

FIGURE 1 is a block diagram depicting a preferred embodiment of invention; and

FIGURES 2, 3, and 4 are schematic diagrams illustrating in detail various portions of the invention.

GENERAL DESCRIPTION

As shown generally in FIGURE 1, three separate conductors 10, 11 and 12 are energized from any suitable source of three-phase A-C energy (not shown). Those skilled in the art will appreciate that the principles of the invention are equally applicable to a single phase system in which only a single phase inverter is used, but to provide a full and adequate disclosure in connection with a three-phase system, the latter is indicated and described. A rectifier 13 is connected for energization from the A-C energy to provide on conductors 14 and 15 a D-C supply voltage. The conductors 14, 15 may be considered a supply circuit for providing the D-C voltage to energize the inverter circuit. A "chopper" or power delivery circuit 16 is connected to selectively pass the unidirectional supply voltage over conductors 17, 18 to a filter 20 which minimizes the effects of ripple or transient phenomena of the unidirectional potential prior to its application over conductors 19, 18 to the three-phase inverter 21. Each of the blocks 21A, 21B and 21C indicates a different phase circuit of the three-phase inverter, and the alternating output voltage of the inverter is passed over the respective output conductors 22, 23, 24 to energize a load 25, such as an electrical motor.

In the lower portion of FIGURE 1 another rectifier circuit 26 is energized over input conductors 11, 12. The output D-C energy from rectifier 26 appears at terminals 64 and 65, and an energizing conductor 66 is coupled to terminal 64. Terminal 65 is coupled to movable tap 67 of a potentiometer 68, one end of which is coupled to input terminal 72 of voltage-controlled oscillator 27. A capacitor 73 is coupled between movable arm 67 and the bottom of potentiometer 68.

Oscillator 27 is of a well-known type, such as those including a unijunction transistor, which produces an output signal varying in frequency as a function of the D-C energizing voltage applied to the oscillator. Thus, in accordance with the present invention, conductor 150 is a means for sensing the level of the D-C voltage passed to inverter 21 over conductor 19, and conductor 150 passes this signal over a Zener diode 74 and resistor 75 to input terminal 76 of oscillator 27, to effect a "cycles-per volt" system regulation. That is, the frequency of the oscillator output signal is continuously regulated in accordance with the voltage level of the input connections of the inverter. Oscillator 27 in its turn supplies pulses to a ring counter circuit 28 for controlling a logic circuit 30. Separate output signals are provided over conductors 31, 32 and 33 (for convenience shown as gathered within a cable 34) to regulate the sequential energization of the SCR's within inverter 21. As will become apparent from the subsequent, more detailed explanation, a single conductor such as 31 shown generally in FIGURE 1 may in fact comprise two (or even more) separate conductors to afford the requisite application of gating potentials to the SCR's, but such particularity is not requisite to the general showing in FIGURE 1. In that the provision of timed pulses by an oscillator whose output frequency is a function of the oscillator D-C input voltage and the distribution of the oscillator output pulses to a ring counter circuit to regulate the operation of a logic circuit is well known and understood in the static inverter art, no more detailed explanation of these portions of the system will be given hereinafter.

The D-C output voltage from terminal 65 of rectifier 26 is also applied as a reference D-C voltage to the bottom of potentiometer 129, the top of which is coupled to conductor 150. Movable tap 139 of this potentiometer is coupled over conductor 35 to the input circuit of chopper control circuit 36, which receives another input signal (related to the current level passed to the inverter) over conductor 37 from the output side of voltage transfer or chopper circuit 16. A suitable output signal is provided by chopper control circuit 36 over conductor 38 to regulate the operation of chopper circuit 16, thereby governing the passage of D-C voltage from conductors 14, 15 to conductors 17, 18 and thus regulating the D-C energization of inverter 21.

Notwithstanding the level of the voltage supplied to inverter 21 over conductors 19, 18, auxiliary energizing or pre-charge circuit 40 is operable to receive input A-C energy over input conductors 10, 11 and 12, rectify the alternating voltage and apply individual unidirectional potentials over the output circuits represented by conductors 41, 42 and 43 (for convenience shown in a single cable 44) to the separate commutating circuits within inverter phase circuits 21A, 21B and 21C. With this general perspective of the inverter system incorporating the novel and unobvious arrangements of the present invention, a more detailed description of one phase of the inverter circuit such as 21A will now be set out to provide more adequate background for subsequent description of the energy transfer control and precharging circuits.

SINGLE PHASE OF INVERTER

In FIGURE 2 inverter phase 21A is shown energized over conductors 19, 18 after the unidirectional energy passes through filter circuit 20. Within the filter a choke 50 is coupled between conductors 17 and 19 to minimize the effects of the sequential opening and closing of the chopper circuit itself. Resistor 51 and a capacitor 52 are coupled in series between conductors 19 and 18, and resistor 53, coupled in parallel with capacitor 52, completes filter circuit 20.

Within inverter phase circuit 21A, the main switching components are indicated as a pair of semiconductor switches or SCR's 54 and 55, but other semiconductor switches may also be utilized. SCR 54 includes an anode 54a, a cathode 54c, and a gate or control element 54g; SCR 55 includes similar elements correspondingly designated. A series circuit extends between conductors 19 and 18 and comprises the anode-cathode path of SCR 54, first winding 57A of the commutating choke assembly, diodes 56 and 58, second winding 57B of the commutating choke assembly, and the anode-cathode path of SCR 55. To simplify the drawing the common magnetic core which intercouples winding 57A and 57B is omitted but it will be understood that these windings are magnetically coupled together by winding upon a common core. Output load conductor 22 is coupled to the common point between diodes 56 and 58. A spillover or energy return transformer 210 is provided, and this transformer may be of the autotransformer type with winding portions 211, 212. One end of winding 211 is coupled to the common connection between diodes 56, 58. Another pair of diodes 60, 61 is coupled in series between conductors 19 and 18, and the common connection of winding portions 211, 212. In a related arrangement diodes 213, 214 are coupled between conductors 19 and 18, an the common connection of those diodes is coupled to the end of winding 212. The provision of spillover or protective diodes such as 60, 61 is now well known, to afford a path for the energy which because of connection to a reactive load such as a motor cannot change its direction of transfer instantaneously responsive to the gating on of one SCR and the turn off of the other. Spillover transformer and diodes 213, 214 operate in a manner now understood in this art to recover commutating energy and return the energy to input circuit 19, 18 without recirculating the energy through the SCR's.

Control or gating signals for SCR 54 are provided over conductor 62. The individual conductors 62 and 70 are represented generally as a single conductor 31 in FIGURE 1 of the drawings. Likewise in FIGURE 1 the single conductor 41 is shown, and this conductor represents two separate conductors 77, 78 of the commutating circuit in FIGURE 2. Conductor 77 is coupled to the junction between winding 57A and the anode of diode 56, and conductor 78 is coupled to the junction between the cathode of diode 58 and winding 57B. Commutating capacitor 80 is coupled between conductor 19 and the junction of winding 57A, the anode of diode 56, and conductor 77, and the other commutating capacitor 81 is coupled between conductor 18 and the junction between winding 57B, the cathode of diode 58, and conductor 78.

Except perhaps for the different connection of the commutating capacitors over conductors 77 and 78, the operation of the inverter circuit 21A will be readily understood to those skilled in the art. Briefly, with the appropriate unidirectional energizing potential difference applied over conductors 19 and 18, the load conductor 22 properly connected to the load, it is initially assumed that SCR 55 is conducting and current is flowing from load conductor 22 over diode 58, winding 57B, and SCR 55 to conductor 18. At this time, SCR 54 is in effect an open circuit and commutating capacitor 80 is charged from the pre-charging circuit over a path including conductor 19, capacitor 80, and conductor 77. Thus the charge on capacitor 80 does not depend on the potential difference between conductors 19, 18. Responsive to the application of the appropriate gating signal over conductor 62, SCR 54 is gated on. Capacitor 80 rapidly discharges through this SCR and winding 57A of the commutating choke assembly to provide a hold-off voltage for SCR 55. The load current is also transferred very rapidly from one to the other of the sub-circuits of inverter 21A, but even with this very rapid transfer the current reversal over a conductor 22 cannot be instantaneous (with a reactive load), nor can current flow in reverse through SCR 54 which was just gated on. Thus, spillover diode 60 accommodates this load current flow during the very brief time interval in which commutation occurs. With the turning on of SCR 54 and shut off of SCR 55, current to the load is now provided from conductor 19 over SCR 54, winding 57A, and diode 56 to load conductor 22. With SCR 55 now an open circuit, the other commutating capacitor 81 is charged from conductor 78 and capacitor 81 to to conductor 18. Thus, the voltage level provided across capacitor 81 is completely independent of the voltage level between conductors 19 and 18. The system is ready for commutation upon receipt of the next gating impulse over conductor 70. The subsequent operation of the inverter as each gating impulse is received from the logic circuit is readily apparent.

Conductor 150 is coupled to conductor 19 to assist in providing a voltage representative signal, related to the input voltage applied to inverter circuit 21A, for utilization in regulating oscillator circuit 27 and chopper control circuit 36.

CHOPPER AND CHOPPER CONTROL CIRCUIT ARRANGEMENT

The chopper circuit 16 and chopper control circuit 36 are shown in detail in FIGURE 3, with rectifier circuit 13 interposed between chopper circuit 16 and input conductors 10, 11 and 12. In the rectifier circuit diodes 83–88 are connected in a conventional bridge arrangement. That is, the cathode of each of diodes 83–88 is coupled to conductor 14, and the anode of each of diodes 86–88 is coupled to conductor 15. Input conductor 10 is coupled to the anode of diode 83 to the cathode of diode 86; input conductor 11 is coupled to the anode of diode 84 and to the cathode of diode 87; and input conductor 12 is coupled between the anode of diode 85 and the cathode of diode 88. Thus, responsive to application of A-C voltage over input conductors 10, 11 and 12, unidirectional output potential appears between conductors 14 and 15.

At the input portion of chopper 16, a first smoothing inductor or choke 90 is coupled between conductors 14 and 91. To complete the filtering of the input energy, a parallel-connected circuit comprising resistor 92 and capacitor 93 is coupled between conductors 91 and 15. An SCR or semiconductor switch 92 is shown with anode 92a coupled to conductor 91, and cathode 92c coupled to conductor 93. The gate or control element 92g of this SCR is itself coupled to another conductor 94.

A diode 97 is coupled between conductors 93 and 94, and resistor 98 is coupled between conductors 94 and 15. Another resistor 100 is coupled between conductors 93 and 94, and conductor 38, over which the chopper gating signals are received, is coupled to conductor 94 at the common connection with diode 97, and resistors 98 and 100.

A diode 101 is coupled between conductors 93 and 15, and another inductor or choke 102 is coupled between conductors 93 and 106. To assist in the filtering operation of choke 102, a capacitor 103 is couple between conductors 106 and 15. To obviate "ringing" or oscillatory action, a pair of semiconductor diodes 104 and 105 are coupled in series, and this series circuit is coupled in parallel with capacitor 103 between conductors 106 and 15. Resistor 107 is also coupled bteween conductors 106 and 15. Another inductor 108 has one end coupled to conductor 106, and the other end portion is coupled, through capacitor 110, to conductor 111 which extends to the chopper control circuit 36. A diode 112 is connected between conductors 106 and 17 at the upper output point of chopper 16. Although not a component of the chopper itself, a metering resistor 113 is coupled between conductors 15 and 18. Thus, a voltage related to the level of current flow through resistor 113 is applied over conductor 37 to chopper regulator circuit 36.

Chopper regulator circuit 36 comprises three separate transistors 120, 121, and 122 each having base, emitter and collector elements designated by the letters b, e, and c, respectively. Energizing conductors 123 and 124 are included in the chopper regulator circuit, with conductor 123 being coupled over a suitable switch 125 (which may be a contact set of a relay indicating appropriate energizing potential is present) to energizing conductor 66. Conductor 124 is coupled over conductor 127 to conductor 15 in the chopper circuit to provide a common reference between the two circuits. Accordingly with a potential difference being applied between conductors 123 and 124 which is positive on conductor 123 with respect to that of 124, and transistors 120–122 being of the NPN type as indicated, the circuit will be suitably energized. Those skilled in the art will appreciate that other elements such as PNP type transistors can be utilized with concomitant polarily reversals of the energizing and signal potentials applied to the various semiconductor switches.

A resistor 128 is coupled between conductor 123 and collector 120c of transistor 120, and resistor 130 is coupled between emitter 120e and conductor 124. A diode 131 is connected as shown between the base and emitter of transistor 120. Control signals are developed across potentiometer 129, which receives a first reference voltage signal from terminal 65 of rectifier 26 (FIGURE 1) and which receives a second reference voltage signal related to the magnitude of the D-C voltage applied to inverter circuit 21A (FIGURE 2) over conductor 150. Thus, there is provided a circuit for algebraically combining a substantially fixed voltage (somewhat like a bias voltage) with a voltage related to the energization level of the inverter circuit. By adjusting the position of movable arm 139 of the potentiometer, the frequency at which gating signals will issue from chopper regulator 36 can be controlled. Thus, potentiometer 129 can be considered as a means for adjusting the voltage level at which the chopper circuit will perform the regulating action. When the level of the voltage appearing at movable arm 139 is sufficiently positive, this signal is applied over conductor 35, resistor 133 and diode 134 to the base of transistor 120 to forward bias this transistor and switch it on, causing it to conduct and develop a positive-going potential at emitter 120e as the voltage drop across resistor 130 increases. Conductor 135 is connected to emitter 120e and to the top of resistor 130, to provide a signal output path through resistor 136 and diode 137 to input element or base 121b of transistor 121. A capacitor 138 is connected between conductor 124 and the common connection between resistor 136 and diode 137. A resistor 140 is coupled between conductor 111, which extends to chopper circuit 16, and the same common connection between resistor 136 and diode 137. Like diode 137, diode 141 is coupled to the base 121b of transistor 121 to provide another input path for turn-on signals to switch on transistor 121. Diode 141 is coupled over a resistor 142 and conductor 37 to the metering resistor 113 in the chopper circuit. Accordingly either conduction of transistor 120 or receipt of a gating signal from the metering resistor is effective to switch on transistor 121.

Resistor 143 is coupled between conductor 123 and collector 121c, and resistor 144 is coupled between emitter 121e and conductor 124. A diode 145 is coupled as shown between base and emitter of transistor 121. A series circuit including a resistor 145', a potentiometer 146 with an adjustable arm or tap 147, and another resistor 148 is coupled between conductors 123 and 150. Potentiometer 146 is, in effect, a means for adjusting the current level of the inverter circuit at which energy delivery over circuit 16 will be interrupted, by reason of the coupling of the lower end of potentiometer 146 to emitter 121e to cooperate in establishing the bias level of this stage. This connection also provides negative feedback for the error signal applied over conductor 35 to the base of transistor 120. Conductor 150 extends to an input point near the upper left hand portion of inverter circuit 21A as shown in FIGURE 2. Emitter 121e of transistor 121 is connected not only to diode 145 and resistor 144, but also to the common connection between potentiometer 146 and resistor 148. A capacitor 151 is coupled between conductor 124 and the common connection between potentiometer 146 and resistor 145'. The output circuit from transistor 121 extends from collector 121c over Zener diode 152 to base 122b of the last transistor 122 in the chopper control circuit. A resistor 153 is coupled between base 122b and conductor 124, and a diode 154 is coupled between the base and emitter of transistor 122. A pair of diodes 155, 156 are coupled in series as shown, and this series circuit is coupled between emitter 122e and a resistor 157, the other end of which resistor is coupled to conductor 38 for passing gating or control pulses to chopper circuit 16. Resistor 158 is coupled between emitter 122e and conductor 124. A resistor 160 is coupled in parallel with diode 155, and in like manner resistor 161 is coupled in parallel with diode 156. A dropping resistor 162 is coupled between conductor 123 and collector 122c of transistor 122.

CHOPPER AND CHOPPER CONTROL: CIRCUIT OPERATION

The better to understand the operation of the chopper circuit 16, it is initially noted that the level of the unidirectional potential difference applied between conductors 14 and 15 is generally of the order of 200 volts. This D-C voltage is passed through the filter including inductor 90 and capacitor 93, and appears between conductors 91 and 15. It is initially assumed that SCR 92 is non-conducting, and that a suitable gating signal is received from chopper control circuit 36 over conductors 38 and 94, and is applied to gate 92g of the SCR.

As the SCR fires, the input voltage (V) between conductors 91 and 15 now appears between conductors 93 and 15, at the input side of the tuned circuit including inductor 102 and capacitor 103. A rapid change of current level with respect to time occurs in inductor 102 and capacitor 103 is rapidly charged to nearly twice (say 2V for purposes of explanation) the input D-C potential V. As the current through choke 102 reaches a minimum value and attempts to reverse the net voltage appearing across SCR 92 is 2V—V or approximately V, and of the proper polarity to shut off SCR 92.

It is apparent that to effect proper commutation of SCR 92 the capacitor 103 should be discharged completely before SCR 92 is fired and cathode 92c should be at, or only slightly above (that is, positive with respect to) ground potential at the time this SCR is fired. Diode 97 prevents the application of negative voltage to gate 92g of SCR 92 when cathode 92c is at a higher potential than that at the common connection of resistors 100 and 98. The potential at this common connection determines the lowest frequency of chopping (hence the lowest voltage if transistor 122 is cut off).

Energy is rapidly passed through SCR 92 each time it is gated on and capacitor 103 is charged; as SCR 92 is turned off, capacitor 103 passes energy over conductor 106 and diode 112 to conductor 17, with the energy being effectively smoothed by choke 50 and capacitor 52 in filter circuit 20 (FIGURE 2). Choke 50 is made much larger than inductor 102 in the chopper circuit, so that a substantially constant current is passed from choke 50 to the inverter circuit. Rectifier 112 at the output of chopper circuit 16 prevents the capacitor 52 from discharging back through the chopper ringing circuit.

Considering now the operation of the chopper regulator circuit 36, as soon as the inverter is energized and switch 125 is closed, the appropriate energizing potential difference appears across conductors 123 and 124 in the control or regulator circuit to provide operating energy for transistors 120, 121, and 122. Responsive to receipt of a low potential over potentiometer arm 139, input resistor 133 and diode 134 to base 120b of the first transistor, a small forward bias is applied to the base-emitter circuit of this transistor and it conducts at a very low level. In that this stage is connected as an emitter-follower circuit, the small positive-going output signal which is developed on conductor 135 is applied as a gating signal to the next stage 121 over resistor 136 and diode 137 to base 121b. Accordingly transistor 121 is almost cut off and only a little current flows from conductor 123 through resistor 143 to the collector of transistor 121. This weak conduction develops a more positive potential at the lower terminal of resistor 143, which change in potential is applied over Zener diode 152 to base 122b of the last transistor 122, to cause this transistor to conduct heavily. When transistor 122 is conducting, the turn-on level of SCR 92 is high and the chopping frequency is high.

Let it now be assumed that the potential normally applied over resistor 133 and diode 134 to base 120b of first transistor 120 rises in response to the increasing D-C voltage (sensed over conductor 150). Transistor 120 conducts and the voltage level at conductor 135 rapidly goes positive, applying a signal over resistor 136 and diode 137 which causes transistor 121 to conduct, allowing the potential at the bottom of resistor 143 to decrease or go more negative. This potential is of the proper polarity and amplitude so that, upon application through Zener diode 152 to base 122b, conduction of transistor 122 is greatly reduced and provides a lower gating potential at emitter 122e of this emitter-follower stage. This gating signal is applied over diodes 155, 156, resistor 157, conductors 38 and 94 to gate 92g of SCR 92. The chopping frequency is thus lowered until the amount of energy passed to the inverter in each chopping cycle (that is, during each conduction of SCR 92) is exactly equal to the amount of energy removed from the inverter by the load. This equilibrium state is then maintained automatically by chopper control circuit 36.

Inductor 108, capacitor 110, resistor 140, and capacitor 138 together form a negative feedback "rate" path, to limit the rate of change of the chopper output voltage for enhancing the stability of chopper control circuit 36. Thus, it is evident that under normal conditions chopper regulator circuit 36 operates essentially in a voltage-limiting mode, being activated to control the frequency of the chopper circuit and regulate energy transfer to the inverter.

An important portion of the chopper regulator circuit is the provision over conductor 37 of a signal related to the level of current flowing from the chopper toward the inverter circuit. This resistor can be made very low in ohmic value, for example of the order of 0.15 ohm, so that only three or four volts are dropped across this resistor when the inverter is operating at rated level. This develops a signal of an amplitude sufficient, when the current passed to the inverter exceeds a predetermined level, to provide a signal over conductor 37, resistor 142, and diode 141 to base 121b of transistor 121, gating this transistor on and correspondingly effecting shut-off of transistor 122 to lower the output from chopper circuit 16 to the minimum value as set by the divider ratio of resistors 100 and 98. This operation in a current-limiting mode is most useful when the equipment is initially energized and the motor is being started from standstill toward rated speed. In general the motor tends to draw a large current from the source of D-C energy through the inverter. The just-described circuit which senses the passage of current over resistor 113 is operative to sense the level of current and protect the inverter components during the initial energization of the complete inverter system, until the motor has reached rated speed and the output voltage of the drive system and the frequency have been raised to normal levels. The motor continues to accelerate and the control arrangement automatically goes into the voltage-limiting mode, in that the current passed over resistor 113 does not exceed the overload or design limit after the motor has come up to speed unless there is an unusual condition such as a short circuit, against which eventuality the chopper regulator circuit 36 also protects the equipment. It is manifest that with both the voltage-limiting and current-limiting modes of operation in a single control or regulator circuit, a stable output voltage and frequency is delivered to a load such as a motor and a maximum of protection is afforded for the inverter circuit.

PRE-CHARGING UNIT: CIRCUIT ARRANGEMENT AND OPERATION

Some of the problems consequent upon the starting of an inverter arrangement with the motor attempting to draw large currents when initially energized have been described. A corollary of these problems is that with the high initial motor current, the voltage and frequency of the inverter are still very low at the start, and under these low voltage conditions the inverter does not usually commutate currents of very high level. Thus the commutation may be faulty during the initial energization period if some steps are not taken to insure that the large currents drawn by the motor will be effectively commutated in the inverter circuit. To insure this, commutating capacitors 80 and 81 (FIGURE 2) of the inverter should be adequately energized notwithstanding the interruption of energization over the chopper circuit at any time and notwithstanding the initial low voltage level, low frequency conditions. It is toward this end of effective commutation that the pre-charging arrangement depicted in greater detail in FIGURE 4 is directed.

As there shown, pre-charging circuit 40 includes an input transformer 170 having a core 171 on which three separate primary windings 172, 173, and 174, and three corresponding secondary windings 175, 176 and 177, are coupled. The primary or input windings are respectively coupled to conductors 10, 11 and 12 as indicated to receive alternating, three-phase energy.

Secondary winding 175 has opposite end portions coupled to the input terminals of a rectifier bridge 178, which includes four diodes 180–183. A capacitor 184 is coupled in parallel with the output terminals of bridge 178 to filter the unidirectional output voltage and a protective resistor 185 is coupled in series between the one output terminal of the bridge and conductor 77. Thus, upon energization of the system appropriate alternating energy is received over transformer 170, rectified in bridge 178, and a D-C potential difference appears between conductors 77 and 78 for application to the commutation capacitors 80, 81 in inverter circuit 21A. In an analogous manner A-C energy transferred over transformer 170 into secondary winding 176 is rectified in bridge 188, filtered in capacitor 194 and passed through resistor 195 for application over conductors 196 and 197 to phase 21B of the inverter circuit. A-C energy received over winding 177 is rectified in bridge 198, filtered in capacitor 204 and after passing through resistor 205 is applied over conductors 206 and 207 to the commutating capacitors (not shown) in phase circuit 21C of the inverter. With this arrangement the requisite energy level is always available to charge the commutating capacitors in each phase circuit even under initial conditions when the voltage and frequency levels are low, and during operation when the translation of energy from the chopper to the inverter may be temporarily interrupted for one reason or another.

SUMMARY

The present invention provides a novel and unobvious inverter system including a chopper circuit for selectively passing D-C energy to the inverter under the control of a novel and unobvious chopper regulator circuit. The regulator circuit is effective, during the initial energization of the system, to insure that the motor does not draw excess current to the inverter and may, if required, operate essentially in a current-limiting mode at this time. At this time the pre-charging circuit is effective to insure that adequate commutating energy is applied to the capacitors within the inverter notwithstanding that at this time both the frequency and the voltage applied to the inverter are low. As the motor comes up to speed, the system assumes its normal operating characteristics as the chopper regulating circuit controls operation of the chopper itself in a voltage-limiting mode in which the main semiconductor switch within the chopper is gated on under regulation of the chopper regulator circuit at a frequency determined by the physical characteristics of components within the circuits. With these significant advances damage to the inverter components is obviated and adequate and effective commutation is always provided notwithstanding that the level of energy delivered to the inverter may be lower than would normally be required for such effective commutation.

Although only a particular embodiment of the invention has been described and illustrated, it is manifest that various modifications and alterations may be made therein. It is therefore the intention in the appended claims to cover all such modifications and alterations as may fall within the true spirit and scope of the invention.

We claim:

1. In an inverter system which includes an inverter circuit having commutating components and operable to translate D-C voltage into A-C voltage for application to a load, and a supply circuit for providing D-C voltage, the improvement which comprises a voltage transfer circuit, including a semiconductor switch, coupled between said supply circuit and said inverter circuit, operable upon actuation of said switch to deliver the D-C voltage from the supply circuit to the inverter circuit, a control circuit connected to regulate the operation of said voltage transfer circuit, means for sensing the level of the voltage delivered to the inverter circuit and for sensing the level of the current delivered to the inverter circuit to regulate the control circuit to interrupt the delivery of voltage to the inverter circuit when the delivered voltage level or the delivered current level exceeds a preset value, and an auxiliary energy supply circuit, coupled to the commutating components in said inverter system, to supply voltage at a substantially constant level to the commutating components irrespective of the level of D-C voltage passed from the voltage transfer circuit to the inverter circuit.

2. In an inverter system which includes an inverter circuit having a pair of semiconductor switches and a pair of commutating capacitors respectively coupled to the switches to assist in commutating of said switches as D-C voltage is translated into A-C voltage for application to a load, and a supply circuit for providing D-C voltage, the improvement which comprises a chopper circuit, including a third semiconductor switch, coupled between said supply circuit and said inverter circuit, operable upon actuation of said third switch to deliver the D-C voltage from the supply circuit to the inverter circuit, a control circuit connected to regulate the operation of said chopper circuit, means for sensing the levels of the voltage and the current delivered to the inverter circuit and for interrupting the delivery of the voltage to the inverter circuit when the delivered voltage level or the delivered current level exceeds a preset value, and an auxiliary energy supply circuit including rectifier means for supplying D-C voltage at a substantially constant level to the commutating capacitors in the inverter circuit, to assure effective operation of the commutating components irrespective of the level of D-C voltage passed from the chopper circuit to the inverter circuit.

3. In a system which includes an inverter circuit having commutating components to assist in the translation of D-C voltage into A-C voltage for application to a load, a first rectifier circuit for receiving A-C voltage from an A-C input circuit and supplying D-C voltage, the improvement which comprises a chopper circuit including a semiconductor switch, coupled between the first rectifier circuit and the inverter circuit, and operable responsive to conduction of said semiconductor switch to transfer D-C voltage from the first rectifier circuit to the inverter circuit, a precharging circuit, including a second rectifier circuit, coupled between the A-C input circuit and the inverter circuit to bypass the first rectifier circuit and the chopper circuit, operable to supply D-C voltage at a substantially constant level to the commutating components in the inverter circuit irrespective of the level of D-C voltage passed to the inverter circuit from the chopper circuit, a chopper control circuit; and means for sensing the levels of the D-C voltage and the D-C current delivered to the inverter circuit, for interrupting delivery of D-C voltage to the inverter circuit when the inverter delivered voltage level or the inverter delivered current level exceeds a preset value, and for increasing delivery of D-C voltage to the inverter circuit when the inverter delivered voltage level is less than said preset value.

References Cited
UNITED STATES PATENTS

| | | | |
|---|---|---|---|
| 2,916,688 | 12/1959 | Weir | 321—18 |
| 2,959,725 | 11/1960 | Younkin | 321—18 |
| 3,124,740 | 3/1964 | Corey et al. | 321—16 XR |
| 3,237,081 | 2/1966 | Martin | 321—18 |
| 3,295,044 | 12/1966 | Pledger et al. | 321—45 XR |
| 3,320,477 | 5/1967 | Boeker | 321—16 XR |

LEE T. HIX, *Primary Examiner.*

W. M. SHOOP, *Assistant Examiner.*